United States Patent
Berger et al.

(10) Patent No.: US 9,217,444 B2
(45) Date of Patent: Dec. 22, 2015

(54) INTAKE CONDUIT ELEMENT AND COMPRESSOR ARRANGEMENT THEREFROM

(75) Inventors: Ingmar Berger, Friedrichshafen (DE); Tobias Männle, Ravensburg (DE); Kajetan Plenk, Lindau (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 756 days.

(21) Appl. No.: 13/529,577

(22) Filed: Jun. 21, 2012

(65) Prior Publication Data

US 2012/0328424 A1    Dec. 27, 2012

(51) Int. Cl.
*F04D 29/42* (2006.01)
*F02M 25/06* (2006.01)
*F02M 35/10* (2006.01)
*F02B 37/00* (2006.01)

(52) U.S. Cl.
CPC ........... *F04D 29/4213* (2013.01); *F02M 25/06* (2013.01); *F02M 35/10118* (2013.01); *F02M 35/10144* (2013.01); *F02M 35/10157* (2013.01); *F02B 37/00* (2013.01); *Y02T 10/121* (2013.01); *Y02T 10/144* (2013.01)

(58) Field of Classification Search
CPC ... F04D 27/009; F04D 27/02; F04D 27/0207; F04D 29/403; F04D 29/4206; F04D 29/4213; F04D 29/66; F04D 29/661
See application file for complete search history.

(56) References Cited

U.S. PATENT DOCUMENTS

| 3,680,534 | A | 8/1972 | Chavant |
| 6,267,106 | B1 * | 7/2001 | Feucht ..................... 123/568.17 |
| 2006/0045764 | A1 * | 3/2006 | Thompson et al. ........... 417/313 |

FOREIGN PATENT DOCUMENTS

| WO | WO-2006/126963 A1 | 11/2006 |
| WO | WO-2008070649 A1 | 6/2008 |
| WO | WO-2009/028802 A2 | 3/2009 |

* cited by examiner

*Primary Examiner* — Richard Edgar
*Assistant Examiner* — Juan G Flores
(74) *Attorney, Agent, or Firm* — Fishman Stewart Yamaguchi PLLC

(57) ABSTRACT

Intake manifold element (1) having a tubular section (3) through which a first fluid (A) can flow in a proposed flow direction (A') via a flow channel (4) from an inlet (4a) to an outlet (4b) of the same, said tubular section being provided for arrangement on a compressor inlet (11a) of a turbocharger, characterized in that the flow channel (4) has a nozzle-shaped design, wherein its cross-section which the fluid can flow through is tapered in the flow direction (A'), wherein the tubular section (3) forms a chamber (6) adjacent to the nozzle-shaped flow channel (4) which serves as flow path from an inlet (6a) to an outlet (6b) for the aspiration of a second fluid (B), the pressure level of said chamber on the inlet (6a) being dependent on the pressure level of the first fluid (A) on the outlet (4b) of the flow channel (4) via communicating outlets (6b, 4b) of the chamber (6) and the flow channel (4).

18 Claims, 5 Drawing Sheets

INTAKE CONDUIT ELEMENT AND COMPRESSOR ARRANGEMENT THEREFROM

CROSS-REFERENCE TO RELATED APPLICATIONS

This application claims priority to German Patent Application 10 2011 110 285.3 filed on Jun. 21, 2011, which is hereby incorporated by reference in its entirety.

TECHNICAL FIELD

The present disclosure relates to an intake manifold element according to the preamble of claim 1. Furthermore, the disclosure relates to a compressor arrangement formed by means of the intake manifold according to the preamble of claim 8.

BACKGROUND

The diversion of the flow of a fluid is often necessary in front of compressors of turbochargers in motor vehicles due to installation space-related conditions, said diversion being realized by means of an inlet manifold, e.g. a diversion by 80° to 90°. In so doing, large radii of curvature are preferable to achieve a homogeneous inflow into the compressor. However, their realization is not always feasible for reasons of installation space-related conditions.

In order to be able to achieve a homogeneous flow against the compressor in spite of this kind of diversion while at the same time generating a vacuum which enables the aspiration of an additional fluid, in particular a blow-by gas by means of the gas flow conducted in the inlet manifold, it is proposed in the undocumented prior art to utilize the vacuum generated inside the interior radius of the inlet manifold, by adding the blow-by gas to an area of the interior radius with a strong flow curvature. However, the interior radius of the manifold which is relatively small for this purpose results in a very uneven flow against the compressor which can disadvantageously result in compressor pumping.

An alternative screen provided to generate the necessary vacuum in front of the aspiration site induces unwanted losses and is also associated with thermodynamic disadvantages.

SUMMARY

Based on the above, an object of the present disclosure is to provide an intake manifold element as well as a compressor arrangement that overcome the disadvantages of the prior art and allow a homogeneous flow against the compressor while at the same time providing a high vacuum for the aspiration of an additional gas flow or a fluid.

With respect to the intake manifold element, this object is solved with the characteristics of claim 1 and with respect to the compressor arrangement with the characteristics of claim 8. Advantageous upgrades and embodiments are stated in the dependent claims.

Based on the disclosure, an intake manifold element with a free-flowing tube section or a tubular section is proposed, which is provided to be arranged on a compressor inlet of a turbocharger. The intake manifold element comprising the free-flowing tubular section can be created as an adapter element, i.e. to be connected with an intake manifold on the one hand and a compressor inlet on the other hand or it can alternatively form an intake manifold, in particular an inlet manifold with the possibility to divert a guided gas flow or a fluid, in particular in the range of 80° to about 90°. The intake manifold element is preferably made of plastic, in particular as a whole, e.g. as an injection-molded part. Alternatively, the intake manifold 1 can also be made of a metal or it can be a hybrid, e.g. made of plastic and metal.

The tubular section of the intake manifold provides a flow path via a flow channel of the intake manifold in a defined flow direction, and the flow channel has an inlet and an outlet for this purpose. The inlet and the outlet of the flow channel in particular also form an inlet and an outlet of the tubular section providing a flow path, which is otherwise preferably designed tube shaped, in particular as a hollow cylinder.

The flow channel is provided for guiding a first fluid, in particular a charge flow, wherein the inlet is provided for the first fluid to enter and the outlet for approaching a compressor via the inlet of the same. Insofar, the proposed flow direction of the first fluid in the tubular section leads from the inlet to the outlet of the flow channel.

Within the scope of the present disclosure, the flow channel of the tubular section is designed in nozzle shape, in particular within the otherwise preferably tube-shaped tubular section, where the cross-section of the same providing a flow path is tapered in the proposed flow direction of the first fluid. As a result of the nozzle-shaped design of the flow channel, the first fluid is advantageously accelerated before it exits the flow channel or in front of a compressor intake in order to achieve a high vacuum for the aspiration.

In the process, the intake manifold element can consist of one or a plurality of parts. The nozzle-shaped flow channel can be formed by means of a funnel-shaped plug-in or push-in part in the otherwise preferably tube-shaped tubular section or the intake manifold element. For instance, the nozzle-forming funnel can be integrated supercooled in the tubular section. In one embodiment, the intake manifold element can form an integral part of the nozzle-shaped flow channel.

A chamber providing a flow path from an inlet to an outlet is arranged within the tubular section adjacent to the nozzle-shaped flow channel, in particular surrounding its circumference—preferably on the outlet side—in the direction of the circumference, for the aspiration of a second fluid. Hereby, the pressure level at the inlet is dependent on the pressure level of the first fluid at the outlet of the flow channel via communicating outlets of the chamber and the flow channel. In this fashion, an aspiration effect can be exerted on the second fluid by the chamber inlet, said aspiration effect can be induced by the accelerated fluid in addition to the aspiration effect of a compressor.

Accordingly, the second fluid, in particular blow-by gas can be aspired into the chamber pressurized with a vacuum and supplied to a compressor inlet via the outlet of the chamber. The inlet of the chamber in particular extends through an exterior wall of the tubular section in the form of an opening. It is proposed to create a chamber with one or a plurality of inlets and preferably a single outlet.

The chamber preferably defines an outflow direction through its outlet which corresponds to an outflow direction of the nozzle-shaped flow channel. This advantageously enables a largely homogeneous flow against a compressor inlet through the first and the supplied second fluid pressurized with a vacuum.

In one embodiment, the chamber is formed as an annular chamber which extends around the entire circumference of the nozzle-shaped flow channel, in particular adjacent to the same, wherein the outlet of the annular chamber has an essentially ring-shaped cross-section and the flow channel preferably has a circular cross-section. The second fluid can be supplied pressurized with a vacuum through the annular chamber around the flow of the first fluid exiting the outlet of the flow channel in such a way as to promote a particularly uniform and undisturbed flow against a compressor inlet. The outlet cross-section of the nozzle-shaped flow channel is preferably formed within the outlet cross-section of the annular chamber, in particular concentric relative to it, when viewed in the outflow direction of the flow channel.

Moreover, a compressor arrangement is also proposed within the scope of the present disclosure. The compressor arrangement comprises a compressor, in particular of a turbocharger having a compressor inlet. In the process, the compressor inlet, which can be formed by means of an annular flange of the compressor, forms the inflow or inlet space, downstream of which a first inlet opening for a main flow is arranged for approaching a compressor wheel.

An intake manifold element as described above is arranged on the compressor inlet of the compressor arrangement to provide the flow against the compressor inlet via or by means of the tubular section(s). For this purpose, the tubular section is preferably suitably connected with the compressor, preferably with an annular flange on the inlet side of the compressor, said annular flange surrounding the inlet space.

The outlets of the nozzle-shaped flow channel and the chamber of the intake manifold element each lead into the inlet space and are each in fluid communication with the first inlet opening of the compressor via the inlet space, in particular also in communication with each other, i.e. via their outlets. Using said type of a compressor arrangement makes it possible to create a considerable vacuum in the desired fashion within the inlet space by way of the flow of the nozzle-shaped channel through its outlet for the aspiration of an additional second fluid while at the same time achieving a homogeneous flow against the compressor.

Within the scope of the present disclosure it is proposed that the outflow direction of the flow channel corresponds to the proposed direction of the flow against the first inlet opening of the compressor, analogous to a main flow direction. Moreover, it is proposed that the outlet of the nozzle-shaped flow channel of the first inlet opening is located on the opposite side in the main flow direction, in particular overlapping the same, in such a way as to achieve a homogeneous flow against the compressor inlet or the compressor wheel. In particular for a compressor with a map-stabilization device, it can be provided that the first inlet opening and the outlet of the flow channel essentially coincide.

In one embodiment, the compressor comprises a second inlet opening downstream of the inlet space for a map-stabilizing bypass flow which surrounds at least part, in particular the entire circumference of the first inlet opening. Said map-stabilization process (KSM) in particular enables the broadening of the compressor map between the pumping and stuffing threshold. Within the present disclosure, the outlet of the nozzle-shaped flow channel and the outlet of the chamber are each in fluid communication with both the first as well as the second inlet opening via the inlet space, in particular also in communication with each other, i.e. via their outlets.

For the compressor arrangement it is in particular provided that the outlet of the nozzle-shaped flow channel and the outlet of the chamber in the inlet space are spaced from any of the first or the first and second inlet opening of the compressor in the main flow direction, i.e. in the outflow direction of the flow channel. Consequently, it is possible to generate the desired, in particular almost homogeneously distributed vacuum in the inlet space.

Within the present disclosure it is further provided that the outlet of the nozzle-shaped flow channel has a cross-section which corresponds to the inlet cross-section of the first inlet opening, in particular each with respect to the shape and/or the dimension, and/or the outlet of the chamber has a cross-section which corresponds to the second inlet opening, in particular each with respect to the shape and/or the dimension. The inlet cross-section of the first inlet opening is preferably created with a circular shape, while the cross-section of the second inlet opening preferably has an annular shape.

In particular with one embodiment of the compressor arrangement, in which the outlet of the chamber of the tubular section of the second inlet opening is arranged opposite in the main flow direction, in particular overlapping in the main flow direction, it is hereby possible to achieve a considerable reduction of the KSM sound emissions. Based on overlapping, in particular essentially coinciding cross-sections of the second inlet opening and the chamber outlet, the sound is advantageously prevented from being conducted against the intended flow direction through the intake manifold element into an upstream aspiration tract.

In one embodiment, the diameter of the outlet of the nozzle-shaped flow channel is selected in the range between 90% of the diameter of the first inlet opening and the diameter of the inlet space.

In order to achieve a homogeneous flow through the compressor arrangement, it is additionally proposed that the outlet of the nozzle-shaped flow channel as well as the first inlet opening have a common middle axis of symmetry running in the main flow direction and/or the outlet of the chamber and the second inlet opening have a common middle axis of symmetry running in the main flow direction.

Additional characteristics and advantages of the disclosure can be gathered from the description of exemplary embodiments of the disclosure below, from the figures and drawings illustrating details essential to the disclosure and from the claims. The individual characteristics can be realized each individually or several in any combination as a variant of the disclosure.

BRIEF DESCRIPTION OF THE DRAWINGS

Preferred embodiments of the disclosure are explained in more detail below based on the enclosed drawings. In the figures.

DETAILED DESCRIPTION

In the description and drawings below, identical reference numbers correspond to elements with the same or comparable function.

Figure 1:
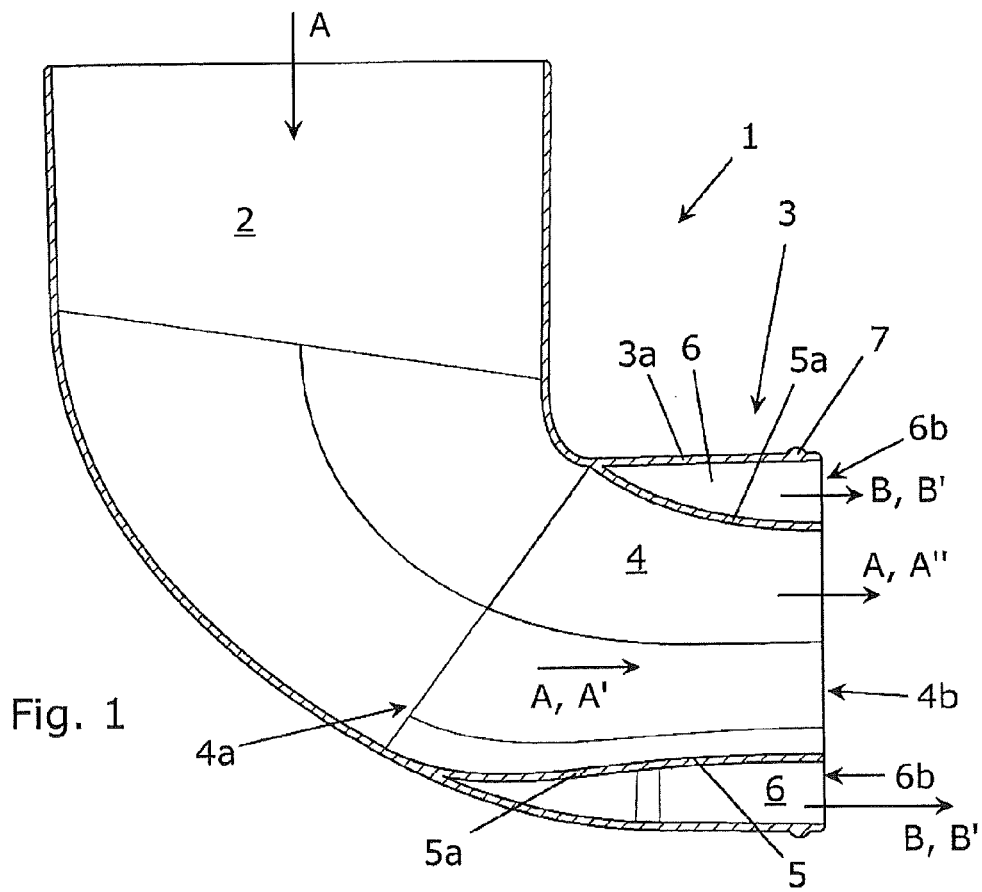
FIG. 1 shows an exemplary side view of a one-piece intake manifold element formed as an inlet manifold.
Figure 2:
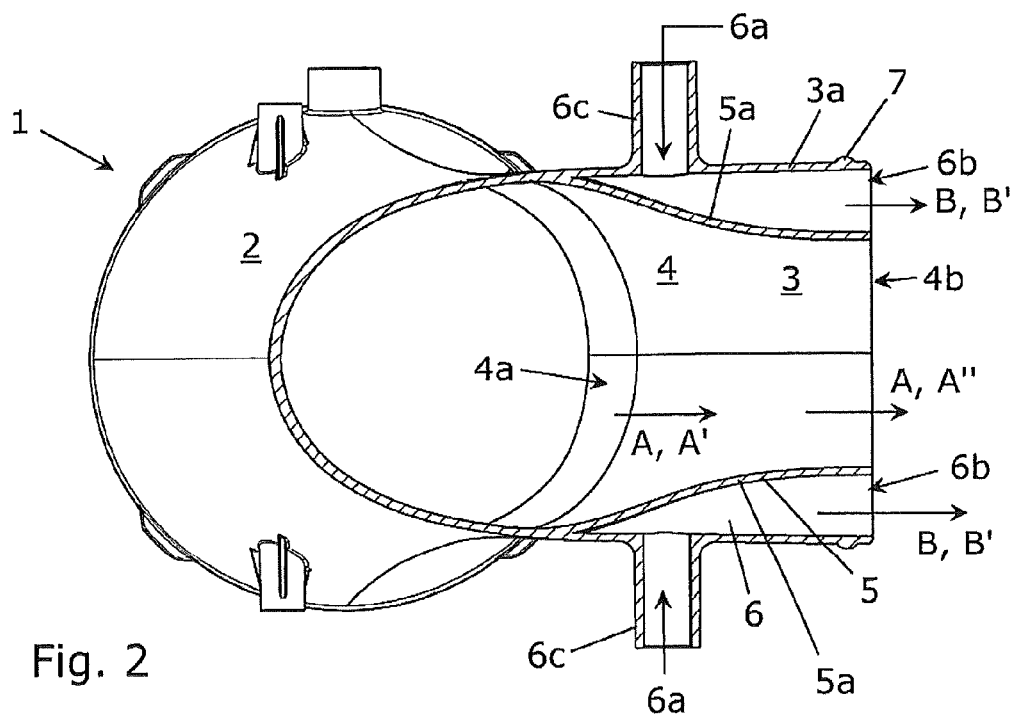
FIG. 2 shows an additional exemplary side view of the intake manifold element of FIG. 1.

FIGS. 1 and 2 each show an exemplary side view of an embodiment of an intake manifold element 1, which is formed as intake manifold 2 or as inlet manifold to approach a compressor inlet of a turbocharger with a first fluid A in the form of intake air or charge. The intake manifold element 1 made as injection molded plastic part comprises a tubular section 3 with a flow channel 4, whereby the tubular section 3 forms a downstream end section of the intake manifold element 1 and serves as flow path through the flow channel 4 via an inlet 4a and an outlet 4b of the flow channel 4, i.e. in a flow direction A'. A fluid A can approach a compressor inlet through the outlet 4b, which also forms an outlet of the tubular section 3 or the intake manifold element 1, i.e. in an outflow direction A". The tubular section 3 is formed in such a way that the first fluid A is forced to pass the entire flow channel 4 in order to flow through the intake manifold element.

The flow channel 4 has a nozzle-shaped design and comprises a circular cross-section. To create the nozzle 5, the cross-section of the flow channel 4 which serves a flow path is tapered inside the tubular section 3 in the proposed flow direction A'. This way, the first fluid A can additionally be accelerated before it exits the outlet 4b.

An annular chamber serving 6 as flow path is formed adjacent to the nozzle-shaped flow channel 4 inside the otherwise tube-shaped tubular section 3, said annular chamber being provided for the aspiration of a second fluid B in the form of a blow-by gas from a crankcase. The vacuum generated by the nozzle 5 is used for this purpose. The annular chamber 6 extends between the tube-shaped exterior wall 3a of the tubular section 3 and around the entire circumference of the wall 5a of the nozzle 5.

As illustrated in FIG. 2, the annular chamber 6 comprises chamber inlets 6a in the form of an opening each in the exterior wall 3a and an annular chamber outlet 6b. One chamber inlet 6a each is provided as conductive connection with a crankcase interior, which comprises a suitable connector 6c for this purpose. In the process, the chamber outlet 6b communicates with the outlet 4b of the nozzle-shaped flow channel 4, whereby the outlets 4b and 6b in particular form a common discharge.

A first fluid A exiting the flow channel 4 through the nozzle 5 at an accelerated speed generates a pressure level at the outlet 4b of the flow channel 4, in particular a vacuum, which a pressure level at the inlets 6a of the annular chamber 6 is influenced by or dependent upon due to the communication of the annular chamber via the outlets 4b, 6b. This means that a suction effect in particular supporting a compressor suction power can be achieved with the accelerated first fluid A for the aspiration of the second fluid B via the chamber inlets 6a.

The annular chamber 6 defines an outflow direction B' through its outlet 6b, which corresponds to the outflow direction A" of the flow channel 4. The annular chamber 6 is formed suitable for this purpose, in particular has a flow-conductive design as illustrated in particular in the figures. This is advantageously achieved with the contour of the nozzle-shaped flow channel 4 or the nozzle 5, in particular by widening the cross-section of the chamber 6 in the direction from the inlet 6a to the outlet 6b and insofar with the possibility of the low flow resistance flow conduction to outlet 6b.

As additionally illustrated in FIGS. 1 and 2, the outlet cross-section of the nozzle-shaped flow channel 4 is preferably formed within the outlet cross-section of the annular chamber 6, in particular concentric relative to it, when viewed in the outflow direction A" of the flow channel. This results in uniform pressure conditions within the annular chamber 6 for the aspiration and distribution of the blow-by gas in front of a compressor inlet and a uniform flow to approach the compressor in which the first fluid A and the second fluid B are combined via the communicating outlets 4b and 6b.

The intake manifold element 1 can easily be locked in place, e.g. by means of an annular collar which can be arranged on a compressor inlet, for the purpose of which e.g. a snap-in lug 7 is formed on the intake manifold element 1.

Figure 3:
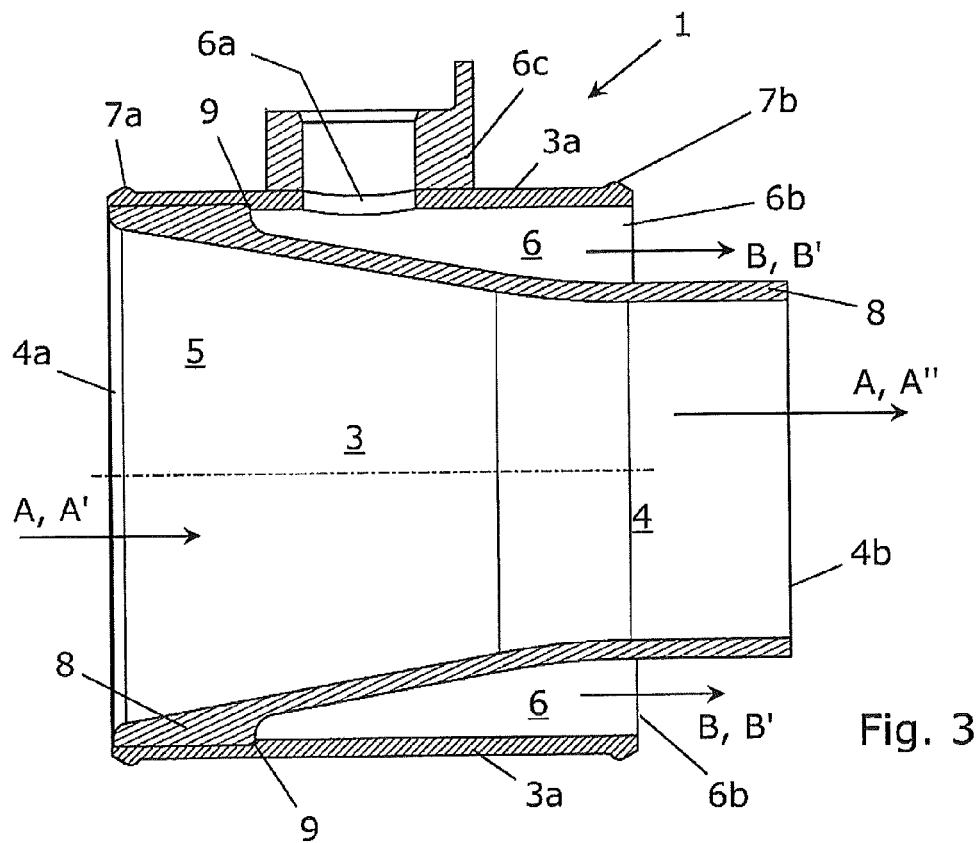
FIG. 3 shows an intake manifold consisting of a plurality of parts for arrangement on an intake manifold and a compressor.
Figure 4:
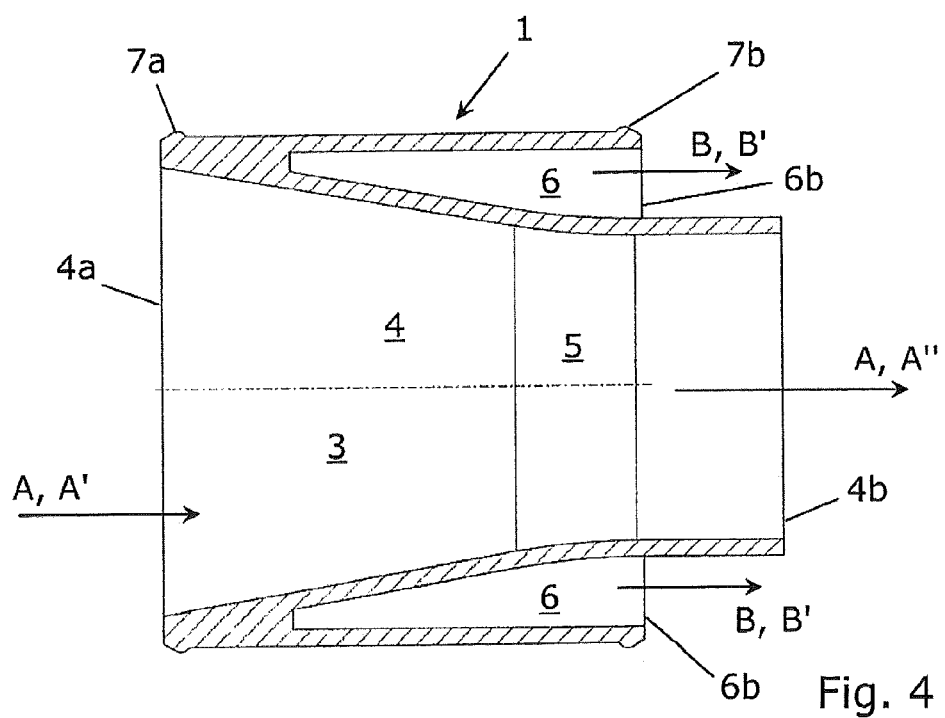
FIG. 4 shows an intake manifold consisting of a single part for arrangement on an intake manifold and a compressor.

FIGS. 3 and 4 each show exemplary further embodiments of an intake manifold element 1, whereby FIG. 3 illustrates an intake manifold element 1 consisting of two parts and FIG. 4 illustrates an intake manifold element 1 consisting of a single part. Contrary to the embodiment described above, the intake manifold elements 1 according to FIGS. 3 and 4 have no curvature in the approach path of the nozzle-shaped flow channel 4, i.e. upstream of it, and are shortened in particular compared to the embodiment according to FIGS. 1 and 2. In such a way, an intake manifold element 1 can be used for the adaptation of different intake manifold embodiments in a compressor. Snap-in elements 7a, 7b each are provided for the connection both with a compressor as well as an intake manifold. Please note that the chamber inlet 6a is not illustrated in the sectional view of FIG. 4.

The intake manifold elements 1 illustrated in FIGS. 3 and 4 each comprise a tubular section 3 for which the flow channel 4 extends in the proposed outflow direction A" of the first fluid A beyond the dimensions of the exterior wall 3a of the annular chamber 6. A designated distance from the outlet 4b to the compressor inlet opening can be adjusted in a simple fashion by cutting the flow channel 4 into suitable sections.

In order to create the nozzle-shaped flow channel 4, the intake manifold element 1 according to FIG. 3 additionally has a separate, funnel-shaped insert 8 which the intake flow or the first fluid A are forced to pass through. The funnel-shaped insert 8 is pressed into the tubular section 3 on the inlet side, i.e. to the point of a catch 9 surrounding the annular shape, which defines the proposed insertion position. Furthermore, the intake manifold element 1 according to FIG. 3 only comprises a single chamber inlet 6a.

Figure 5:
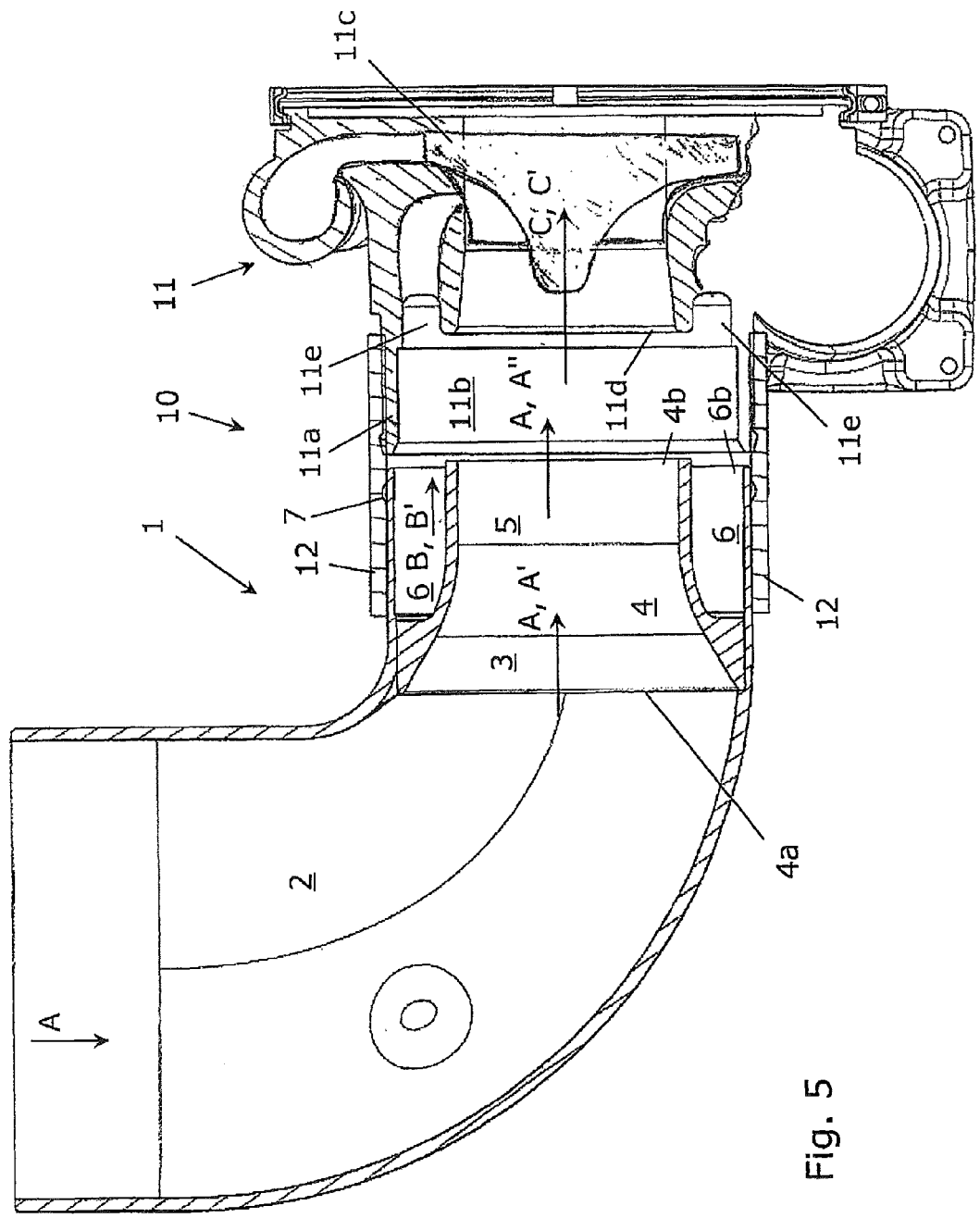
FIG. 5 shows an exemplary side view of an intake manifold element which is formed of a plurality of parts and arranged on a compressor inlet.
Figure 6:
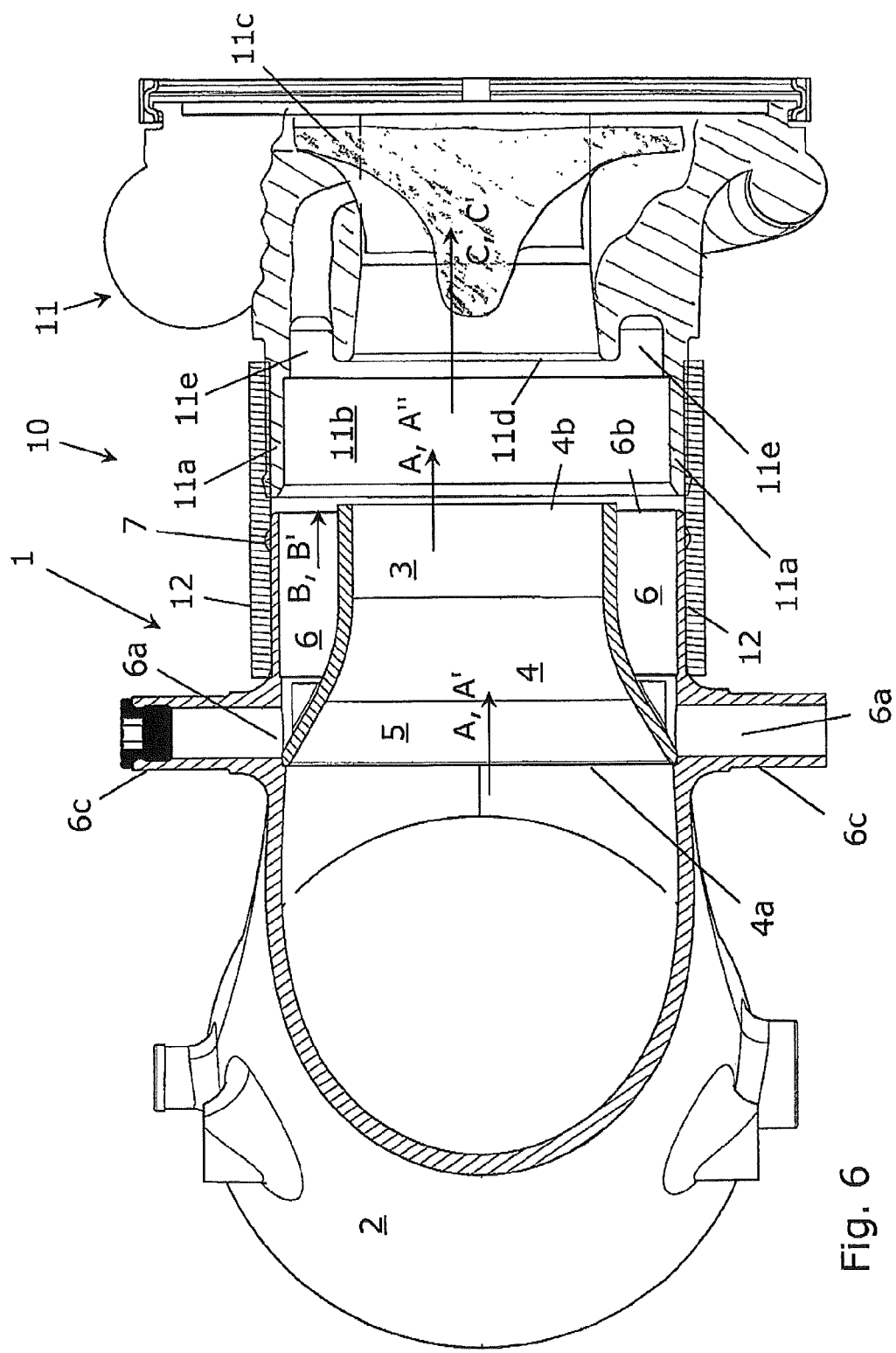
FIG. 6 shows a further exemplary side view of the arrangement of FIG. 5.

FIGS. 5 and 6 each illustrate a compressor arrangement 10 with a compressor 11 of a turbocharger, which are each formed by means of an intake manifold element 1. The compressor 11 comprises an annular compressor inlet 11a or a compressor inlet in the shape of an annular collar which forms an inlet space 11b for approaching a compressor wheel 11c arranged downstream of the inlet space 11b. The intake manifold element 1 is fastened on the compressor inlet 11a in such a way by means of an annular collar 12, that a media-tight flow guidance of the first fluid A and second fluid B from the outlets 4b, 6b of the intake manifold element 1 to the compressor wheel 11c can be achieved.

In the compressor arrangement 10, the intake manifold element 1 is arranged on the compressor 11 in such a way that the outflow direction A" of the outlet 4b as well as the one of outlet 6b each correspond to an intended approach flow direction C' of a first inlet opening 11d formed downstream of the inlet space 11b and a second inlet opening 11e surrounding the first one in an annular shape. In so doing, the first inlet opening 11d is provided for the approach of a compressor wheel 11 by means of a main fluid flow C and the second inlet opening 11e which surrounds the first inlet opening 11d is provided for a map-stabilizing bypass flow or a KSM device (map-stabilization process, KSM).

The main fluid flow C and the bypass flow are created by the intake flow A through the intake manifold element 1 which transports or is able to transport the largest fluid volume over time and in addition by the second fluid B aspired via the annular chamber 6. As illustrated in FIGS. 5 and 6, the outflow direction A" of the first fluid A and the flow direction C' of the main fluid flow C correspond to each other.

The outlets 4b and 6b of the nozzle-shaped flow channel 4 and the annular chamber 6 each lead into the inlet space 11b, whereby every outlet 4b and 6b is in fluid communication with both the first inlet opening 11d as well as also with the second inlet opening 11e via the inlet space 11b. For this purpose, a barrier-free space or a gap is formed between the outlets 4b and 6b on the one hand and the first inlet opening 11d and the second inlet opening 11e on the other hand, said space making both the fluid communication among each other as well as the achievement of a homogeneous pressure distribution possible.

In the process, the outlet 4b of the intake manifold element 1 has a cross-section which in particular corresponds to the inlet cross-section of the first inlet opening 11d with respect to its shape and size, and the outlet 6b of the annular chamber 6 has a cross-section which in particular corresponds to the second inlet opening with respect to its shape and size. In general, it is provided that the diameter of the outlet 4b of the nozzle-shaped flow channel 4 ranges between 90% of the diameter of the first inlet opening 11d and the interior diameter of the compressor inlet 11a.

As illustrated in FIGS. 5 and 6, the outlet 4b of the nozzle-shaped flow channel 4 of the first inlet opening 11d in the main flow direction C' or outflow direction A" is arranged opposed overlapping the same in the main flow direction C' and the outlet 6b of the second inlet opening 11e is arranged opposed overlapping in the main flow direction C', i.e. across from the free space formed in between. In particular, the outlet 4b and the outlet 6b each largely coincide with the inlet opening 11d and 11e, respectively. Hereby, the outlet 4b of the nozzle-shaped flow channel 4 in addition to the first inlet opening 11d as well as the outlet 6b of the chamber 6 and the second inlet opening 11e each comprise a common middle axis of symmetry running in the main flow direction C'. Said arrangement advantageously enables a largely undisturbed approach of the first and second inlet openings 11d, 11e and as a result of the shading of the second inlet opening 11e by means of the annular chamber 6 additionally effectively the reduction of the sound emissions of the KSM device, i.e. a sound retention.

Figure 7:
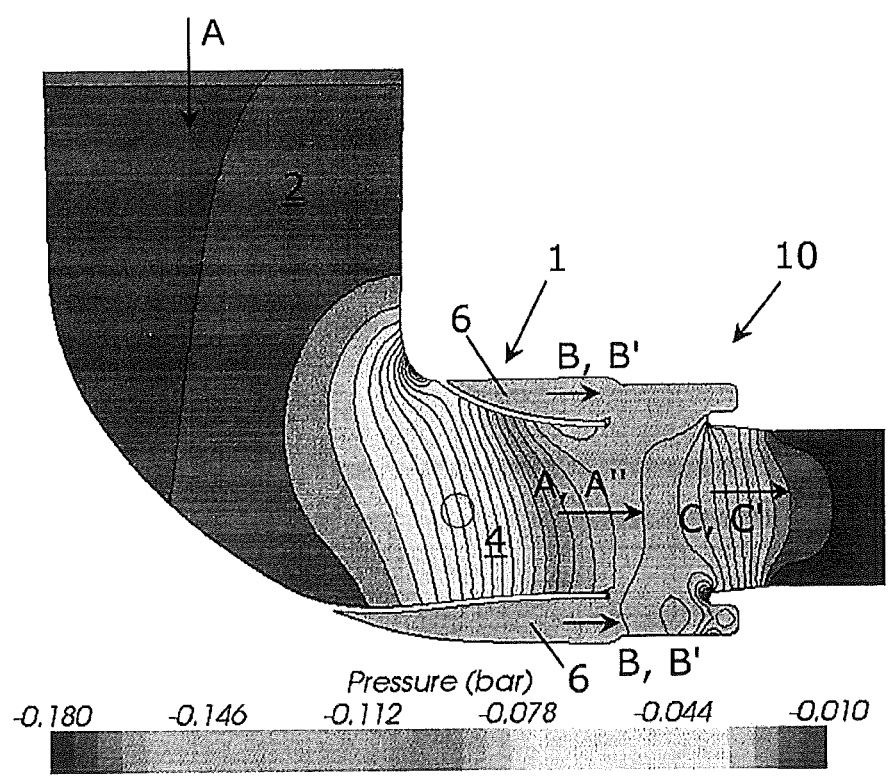
FIG. 7 shows an exemplary view which illustrates the pressure distribution with the use of the intake manifold element in an arrangement comprising an intake manifold and a compressor.

FIG. 7 shows an exemplary representation of a pressure distribution which illustrates the intentionally heightened vacuum achievable with the intake manifold element 1 within a compressor arrangement 10 as described above. As shown in FIG. 7, the compressor arrangement 10—aside from the advantageous provision of a large inlet radius of the inlet manifold 2 formed by means of the intake manifold element 1—can provide a considerable vacuum, at hand for instance in the range of about −0.08 bar to −0.12 bar, for the aspiration of the second fluid B in the region around the outlet 4b of the flow channel 4 as well as the inlet space 11b. In the process, a vacuum in the range of about −0.12 bar is present in the annular chamber, which is considerably heightened compared to an upstream vacuum in the inlet manifold 2, which is only within a range of about −0.010 to −0.044 bar at hand.

The invention claimed is:

1. An intake manifold element having a tubular section through which a first fluid can flow in a proposed flow direction via a flow channel from an inlet to an outlet of the same, said tubular section being provided for arrangement on a compressor inlet of a turbocharger, wherein the flow channel has a nozzle-shaped design, wherein its cross-section which the fluid can flow through said cross section is tapered in the flow direction, said tubular section forming a chamber adjacent to the nozzle-shaped flow channel which serves as flow path from an inlet to an outlet for the aspiration of a second fluid, the pressure level of said chamber on the inlet being dependent on the pressure level of the first fluid on the outlet of the flow channel via communicating outlets of the chamber and the flow channel;

wherein the chamber is an annular chamber having an outlet that concentrically surrounds the outlet of the nozzle-shaped flow channel;

wherein the compressor inlet includes a first inlet opening and a second inlet opening that concentrically surrounds the first inlet opening;

wherein the outlet of the annular chamber and the first inlet opening of the compressor have a respective one of two diameters that are equal to one another;

wherein the outlet of the annular chamber and the first inlet opening of the compressor are disposed along a common middle axis of symmetry.

2. The intake manifold element according to claim 1, wherein the chamber defines an outflow direction through its outlet, which extends in a direction parallel to the outflow direction of the nozzle-shaped flow channel.

3. The intake manifold element according to claim 1, wherein the annular chamber extends around the entire circumference of the nozzle-shaped flow channel, wherein the outlet of the annular chamber has an essentially ring-shaped cross-section.

4. The intake manifold element according to claim 3, wherein the outlet cross-section of the nozzle-shaped flow channel is formed within the outlet cross-section of the annular chamber, in particular concentric relative to it, when viewed in the outflow direction of the flow channel.

5. The intake manifold element according to claim 1, wherein the inlet of the chamber extends as an opening through an exterior wall of the tubular section.

6. The intake manifold element according to claim 1, wherein the tubular section is a component of an intake manifold element formed as intake manifold.

7. The intake manifold element according to claim 1, wherein the intake manifold element comprises a funnel-shaped insert in the tubular section to create the nozzle-shaped flow channel, said insert in particular consisting of one or a plurality of parts.

8. The intake manifold element according to claim 1, wherein the outlet of the nozzle-shaped flow channel and the second inlet opening of the compressor have a respective one of two diameters that are equal to one another.

9. The intake manifold element according to claim 1, wherein the outlet of the nozzle-shaped flow channel and the second inlet opening of the compressor are disposed along the common middle axis of symmetry.

10. A compressor arrangement having a compressor, in particular of a turbocharger which comprises a compressor inlet, wherein the compressor inlet forms an inlet space, downstream of which a first inlet opening for a main flow is arranged to approach a compressor wheel, wherein an intake manifold element is arranged in the compressor inlet to approach the compressor inlet via a tubular section, wherein the intake manifold element has a nozzle-shaped flow channel and a chamber that have a respective one of two outlets, and each one of the outlets leads into the inlet space and is in fluid communication with the first inlet opening via the inlet space;

wherein the outlet of the chamber concentrically surrounds the outlet of the nozzle-shaped flow channel;

wherein the compressor inlet further includes a second inlet opening that concentrically surrounds the first inlet opening;

wherein the outlet of the chamber and the first inlet opening of the compressor have a respective one of two diameters that are equal to one another;

wherein the outlet of the annular chamber and the first inlet opening of the compressor are disposed along a common middle axis of symmetry.

11. The compressor arrangement according to claim 10, wherein a second inlet opening of the compressor for a map-stabilizing bypass flow is arranged downstream of the inlet space at least partly surrounding the first inlet opening, wherein the outlets of the nozzle-shaped flow channel and the chamber are each in fluid communication with the first and the second inlet opening vial the inlet space.

12. The compressor arrangement according to claim 11, wherein the outlet of the chamber of the tubular section of the second inlet opening is arranged opposed in the main flow direction, in particular overlapping the same in the main flow direction, and the outlet of the nozzle-shaped flow channel of the first inlet opening is arranged opposed in the main flow direction, in particular overlapping the same in the main flow direction.

13. The compressor arrangement according to claim 10, wherein the outlet of the nozzle-shaped flow channel has a cross-section which corresponds to the inlet cross-section of the first inlet opening and/or the outlet of the chamber has a cross-section which corresponds to the cross-section of the second inlet opening.

14. The compressor arrangement according to claim 10, wherein the diameter of the outlet of the nozzle-shaped flow channel ranges between 90% of the diameter of the first inlet opening and the interior diameter of the compressor inlet.

15. The compressor arrangement according to claim 10, wherein the outlet of the nozzle-shaped flow channel and the outlet of the chamber in the inlet space are spaced apart from any of the first or the first and second inlet opening of the compressor in the main flow direction.

16. The compressor arrangement according to claim 10, wherein the outlet of the nozzle-shaped flow channel as well as the first inlet opening have a common middle axis of symmetry running in the main flow direction and/or the outlet of the chamber and the second inlet opening have a common middle axis of symmetry running in the main flow direction.

17. The compressor arrangement according to claim 10, wherein the diameter of the outlet of the nozzle-shaped flow channel is equal to the diameter of the first inlet opening of the compressor inlet, and the outlet of the nozzle-shaped flow channel and the first inlet opening are disposed along a common axis and spaced apart from one another.

18. The compressor arrangement according to claim 17, wherein the diameter of the outlet of the annular chamber is equal to the diameter of a second inlet opening of the compressor that at least partly surrounds the first inlet opening, the outlet annular chamber and the second inlet opening are disposed along a common axis and spaced apart from one another.

* * * * *